(12) United States Patent
Neidigk et al.

(10) Patent No.: US 11,074,795 B1
(45) Date of Patent: Jul. 27, 2021

(54) INDUCTIVE CIRCUIT SENSOR SYSTEM AND METHOD

(71) Applicant: National Technology & Engineering Solutions of Sandia, LLC, Albuquerque, NM (US)

(72) Inventors: Stephen Neidigk, Albuquerque, NM (US); Casey Eugene Burr, Albuquerque, NM (US); Stephen N. Sanderson, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 16/868,264

(22) Filed: May 6, 2020

(51) Int. Cl.
  *G08B 13/24* (2006.01)
  *G01V 3/10* (2006.01)

(52) U.S. Cl.
  CPC .......... *G08B 13/2497* (2013.01); *G01V 3/10* (2013.01)

(58) Field of Classification Search
  CPC ...... G06F 21/6218; G06F 21/60; G06F 21/55; G06F 2221/2113; G06F 16/22; G06F 1/1654; G06F 21/10; G06F 21/44; G06F 21/577; G06F 12/14; G06F 1/1647; G06F 1/3218; G06F 21/50; G06F 21/554; G06F 21/566; G06F 21/64; G06F 21/78; G06F 21/87; G06F 2212/72; G06F 2221/034; G06F 2221/2111; G06F 2221/2143; G06F 3/0622; G06F 3/0637; G06F 3/0679; G06F 11/1435; G06F 11/1451; G06F 21/0811; G06F 16/128; G06F 1/1626; G06F 1/1641; G06F 1/1658; G06F 1/1698; G06F 21/32; G06F 21/56; G06F 21/604; G06F 21/62; G06F 21/6254; G06F 2201/84; G06F 2212/283; H04L 63/10; H04L 67/02; H04L 63/08; H04L 63/1416; H04L 63/0823; H04L 63/14; H04L 63/168; H04L 63/083; H04L 63/1408; H04L 63/145;
  (Continued)

(56) References Cited

U.S. PATENT DOCUMENTS 3,978,006 A * 8/1976 Topp .................... C04B 35/486
                                                    252/408.1
9,032,531 B1 * 5/2015 Scorvo ................ H04L 63/1408
                                                    726/25
(Continued)

*Primary Examiner* — Daniel Previl
(74) *Attorney, Agent, or Firm* — Daniel J. Jenkins

(57) ABSTRACT

An inductive circuit sensor system and method for monitoring an electromagnetic signal path through a circuit is shown. A protected element or door is movably positionable adjacent to the stationary element or frame in a monitored position. A conductive sensor pattern element is connected to a pair of inductive coils. The pattern element is a conductive wire traversing a predetermined cross-section of the door. The frame has a transmitting coil in communication with a microcontroller. The transmitting coil is coupled with the first coil and a receiving coil is coupled with the second coil. The transmitting coil receives a signal from the microcontroller and couples the signal to the pattern element. The signal is in communication with a receiving port on the microcontroller. The microcontroller is programmed to compare the signal from the transmit port with the signal at the receiving port.

20 Claims, 2 Drawing Sheets

(58) Field of Classification Search
CPC ... H04L 63/20; H04L 63/105; H04L 63/1425; H04L 63/1441; H04L 29/06102; H04L 29/06115; H04L 29/06149; H04L 29/08009; H04L 29/08045; H04L 49/20; H04L 61/2015; H04L 61/6022; H04L 63/0236; H04L 63/0263; H04L 63/0876; H04L 63/101; H04L 63/107; H04L 63/1458; H04L 63/162; H04L 67/303; H04L 67/306; H04L 69/161; H04L 69/163; H04L 69/168; H04L 69/32; H04L 69/324; H04L 69/326; H04L 51/00; H04L 63/0853; H04L 63/0861; H04L 9/30; H04L 9/3297; H04L 2463/141; H04L 41/0213; H04L 43/028; H04L 63/0209; H04L 63/0218; H04L 63/0272; H04L 63/123; H04L 63/1433; H04L 65/4076; G06Q 10/00; G06Q 30/0185; G06Q 50/265; G06Q 10/10; G06Q 50/01; G06Q 10/109; G06Q 30/0261; G06Q 30/0267; G06Q 30/00; B64D 45/0015; B64D 45/0059; G08B 13/19621; G08B 13/19645; G08B 13/1965; G08B 13/1966; G08B 13/19673; G08B 13/19695; G08B 13/124; G08B 17/10; G08B 29/186; G08B 7/06; H04M 1/72566; H04M 1/0254; H04N 21/8358; H04N 21/6405; H04N 21/64322; H04N 21/64723; H04W 4/21; H04W 12/06; H04W 4/16; B63G 2009/005; B63G 9/04; B67D 7/16; B67D 7/76; B67D 7/04; B67D 7/0486; B67D 7/08; B67D 7/222; B67D 7/36; B67D 7/62; E04B 1/948; E04B 2/7411; E04B 2/7457; G01S 15/04; G01S 15/66; G01S 15/87; G01S 15/876; G01S 7/003; G01S 7/529; G01S 7/539; G01S 7/54; G09F 3/0317; G09F 3/0329; G09F 3/0376; B01L 2300/168; B01L 2400/0683; B01L 3/5029; B01L 3/5082; B64G 1/56; B65D 25/02; B65D 90/00; B65D 90/026; B65D 90/22; E04H 17/00; E04H 17/003; E04H 17/24; E05B 65/1033; E05B 65/104; G01F 1/68; G01L 19/0007; G01M 9/065; G01N 1/02; G01N 2001/028; G01N 2021/0307; G01N 21/01; G01N 21/0303; G01N 21/031; G01N 21/76; G01N 21/763; G01N 21/94; G01N 2201/0221; G01N 2201/065; G01N 35/00693; G01R 31/08; G07C 9/215; G07C 9/253; G07F 13/025; Y10T 70/7904
USPC ............ 340/552, 3.1, 628, 541, 567, 568.1, 340/568.8, 571, 582, 588, 636.11, 652, 340/691.6
See application file for complete search history.

(56) References Cited

U.S. PATENT DOCUMENTS

| | | | |
|---|---|---|---|
| 10,397,246 B2 * | 8/2019 | Raff | H04L 63/0218 |
| 2007/0133350 A1 * | 6/2007 | McDonald | G01S 7/539 367/93 |
| 2009/0115607 A1 * | 5/2009 | Beinhocker | G08B 13/126 340/541 |
| 2009/0315669 A1 * | 12/2009 | Lang | E05B 65/104 340/3.1 |
| 2011/0057460 A1 * | 3/2011 | Onofrio | D06F 39/14 292/251.5 |
| 2015/0358790 A1 * | 12/2015 | Nasserbakht | G06F 16/128 455/414.1 |
| 2020/0271815 A1 * | 8/2020 | Milford | E21B 47/13 |

* cited by examiner

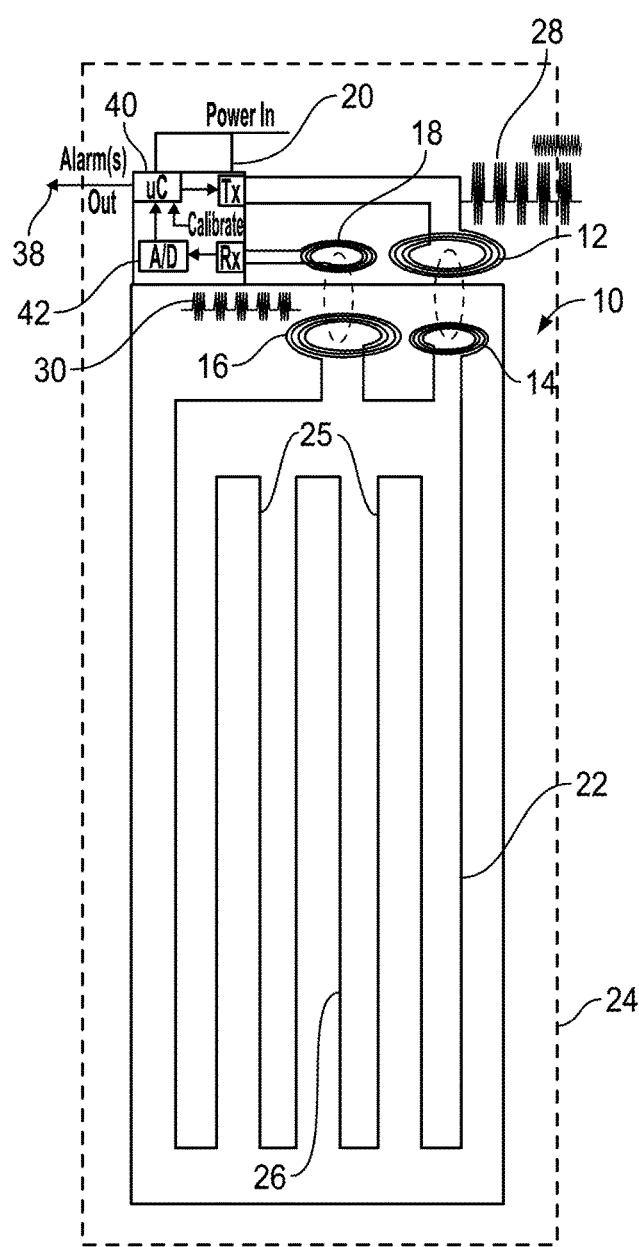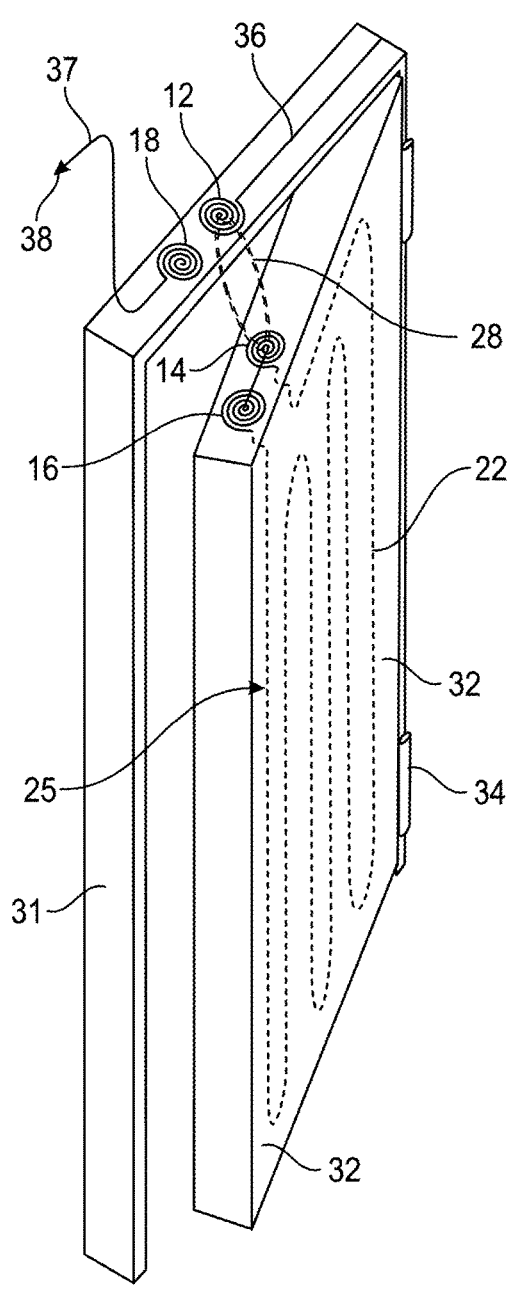
FIG. 1
FIG. 2

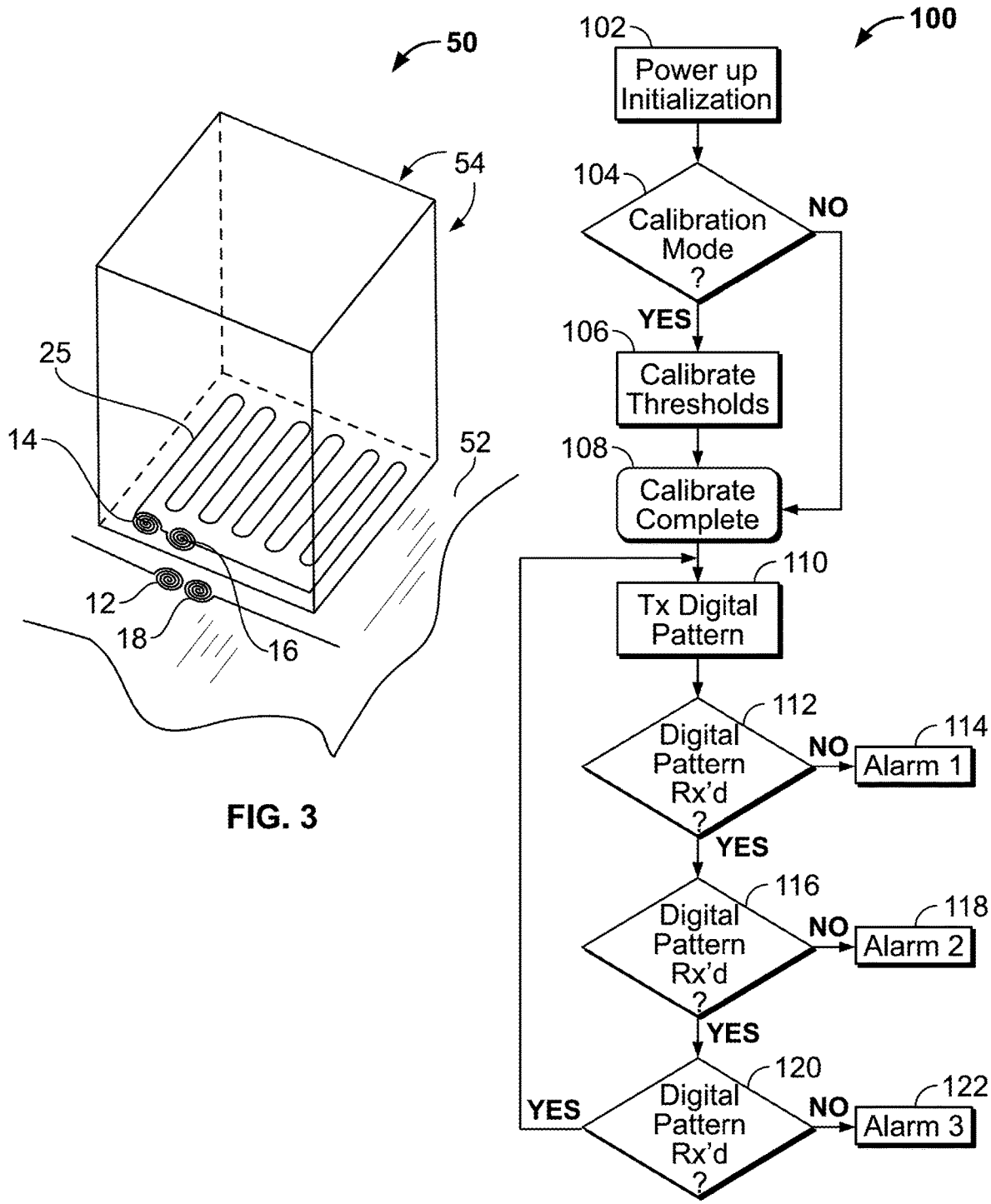

INDUCTIVE CIRCUIT SENSOR SYSTEM AND METHOD

STATEMENT REGARDING FEDERALLY SPONSORED RESEARCH OR DEVELOPMENT

This invention was developed under Contract No. DE-NA0003525 awarded by the United States Department of Energy/National Nuclear Security Administration. The Government has certain rights in this invention.

BACKGROUND OF THE INVENTION

The application generally relates to an inductive circuit sensor and method for intrusion detection. The application relates more specifically to an inductive circuit sensor and conductive wire path for detection of barrier penetration and barrier removal.

Currently a balanced magnetic switch, or BMS, is utilized in a security alarm system as a means of detecting if a door is open or closed. BMS was developed over 40 years ago. The BMS uses magnetic reed switches fixed on, e.g., a door frame, and detects when a permanent magnet fixed to the door move as the door opens. There is a need to effectively detect unauthorized door entries in a security alarm system, for applications including industry, energy, aerospace, and United States government facilities. The BMS is installed in nearly every secure facility in the United States.

Because of security limitation of the BMS technology, high security sites are therefore forced to deploy additional sensor systems to augment the limitations of systems that use BMS sensors. BMS sensors function well for detecting if the monitored door is opened. However, if a monitored door is not opened but merely penetrated, the BMS sensor is not able to detect the penetration.

Alternative intrusion detection systems include Video Analytics to detect door openings. However, Video Analytics may generate nuisance alarms as light levels change. For example, if the lights are switched on or off, or if the lights flicker, a nuisance alarm may be triggered. If the video camera is located in a dark room and directed at the door, light bleeding in from an adjacent hallway may cause a nuisance alarm. Also, variations in ambient sunlight coming through a window, or automobile headlights from a passing automobile, may also generate a nuisance alarm. The need to provide static ambient light conditions has impeded the use of Video Analytics to detect door openings. An Infrared Intrusion Detection System (IRIDS) does not depend on the light level in the secured environment.

Another existing security alarm system employs a Passive Infrared (PIR) sensor. PIRs are also known to generate excessive nuisance alarms. PIR nuisance alarm sources include hot or cold air influx from heating and air conditioning system, hot air and resulting infrared radiation that emanates from hot computers; windows heated by direct sunlight. An IRIDS will not alarm when subjected to these nuisance alarm sources. The IRIDS sensor is not subject to these technical limitations of PIR.

What is needed is a sensor system and method that utilizes inductive power transfer to create a circuit for detecting both open and penetrated doors in a security alarm system. Inductive power coils placed near each other act as a switch in the sensor system and a highly configurable continuity loop (Stitched Sensor) placed in series with the coils acts as a breach detection sensor.

The disclosure is a system and/or method that satisfies one or more of these needs or provides other advantageous features. Other features and advantages will be made apparent from the present specification. The teachings disclosed extend to those embodiments that fall within the scope of the claims, regardless of whether they accomplish one or more of the aforementioned needs.

SUMMARY OF THE INVENTION

One embodiment relates to an inductive circuit sensor system for monitoring an electromagnetic signal path through a circuit. The system includes a protected element and a stationary frame element. The protected element is movably positionable adjacent to the stationary element when the protected elements is in a monitored position. The protected element includes a conductive sensor pattern element. The conductive sensor pattern element includes a first end connected to a first inductive coil and a second end connected to a second inductive coil. The conductive sensor pattern element has a conductive wire arranged in a path traversing a predetermined cross-section of the protected element. The stationary frame element includes a transmitting coil in electromagnetic communication with a microcontroller. The transmitting coil is electromagnetically coupled with the first inductive coil. A receiving coil is electromagnetically coupled with the second inductive coil. The transmitting coil receives a signal from a transmit port on the microcontroller and couples the signal to the conductive sensor pattern element via the first inductive coil. The signal is coupled through the second inductive coil to the receiving coil. The receiving coil is in communication with a receiving port on the microcontroller. The microcontroller is programmed to compare the signal from the transmit port transmitted to the transmit coil with the signal at the receiving port from the receiving coil.

Another embodiment relates to a method for detecting a security breach of a protected element. The method includes the steps of generating a signal by the microcontroller; transmitting the signal to an inductive sensing circuit; querying whether the digital pattern is received and: in response to the signal not being received, generating a first alarm condition; and in response to the signal being received: querying whether the received signal is less than a predetermined upper limit and: in response to the received signal exceeding the upper limit, generating a second alarm condition; in response to the received signal being less than the upper limit, querying whether the signal exceeds a predetermined lower limit; and in response to determining the received signal to be less that the lower limit, generating a third alarm condition.

Yet another embodiment relates to a door frame assembly. The door frame assembly includes a door. The door is movably attached to the door frame so that the door moves between an open and closed position. An electrical conductor transmits power to a first coil. A monitoring circuit of the door frame assembly includes a second coil disposed on the door opposite the first coil, and inductively coupled with the first coil for receiving the input power. An output of the second coil communicates with a serpentine conductive path disposed in the door. The serpentine conductive path is arranged to cover substantially all of the surface area of the door. The serpentine conductive path conducts the signal through the door to a third coil. The third coil is positioned on the door and is connected to an output terminal of the serpentine conductive path. A coil signal is electromagnetically coupled by the third coil to a fourth coil. The fourth coil communicates with an alarm circuit via a return conductor in the door frame assembly. An air gap separates the first coil and the second coil and is maintained at less than or equal to a predetermined distance of separation such that when the first coil and the second coil are separated by a distance greater than the predetermined distance of separation, the magnetic coupling is interrupted and the received signal Rx does not equal the transmitted signal Tx when sensed by a microcontroller in communication with the serpentine conductive path.

Still another embodiment relates to a conductive sensor pattern element. The conductive sensor pattern element includes a conductive wire arranged in a path traversing a predetermined cross-section of a protected element. The conductive wire has a first end and a second end. The first end is connected to a first inductive coil to form a continuous portion of a sensing circuit. The sensing circuit is configured to transmit a secure signal.

The novel systems and methods disclosed herein combine detection of barrier penetration and barrier removal. The method combines inductive power transfer methods and systems that function as a switch to detect removal of a barrier relative to a stationary surface, and a serpentine conductive path to detect penetration in the barrier in the event that the conductive path is opened.

Alternative exemplary embodiments relate to other features and combinations of features as may be generally recited in the claims.

BRIEF DESCRIPTION OF THE DRAWINGS

The application will become more fully understood from the following detailed description, taken in conjunction with the accompanying figures, wherein like reference numerals refer to like elements, in which:

FIG. 1 shows an inductive circuit of the present invention.

FIG. 2 shows an exemplary embodiment of the inductive circuit sensor door monitoring system.

FIG. 3 shows an alternate embodiment of the inductive circuit sensor door monitoring system.

FIG. 4 an exemplary embodiment of a flow diagram of the inductive current sensing method.

DETAILED DESCRIPTION OF THE INVENTION

Before turning to the figures which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting.

Referring to FIG. 1, an inductive circuit 10 of the present invention is shown. Inductive circuit 10 includes a pair of transmitter coils 12, 14. Coil 12 is connected to a transmitting signal or source 20. Coil 12 induces power in coil 14 when the pair of coils 12, 14 are disposed adjacent each other with their respective central axes aligned. A current is induced in receiving coil 14 when a signal is present in coil 12. Coils 12, 14 are arranged in proximity with each other to transfer power. When coils 12, 14 are separated by a small gap, e.g., 0.32 centimeter (cm), power transfer is interrupted.

In one embodiment, transmitter (Tx) 20 is in electronic communication with and transmits a signal 20 to coil 12. Signal 20 may be modulated and inductively coupled by coil 12 into the incoming coil 14 embedded within or on the surface of protected element 24, e.g., a door (see, e.g., FIG. 2). The coupled power is then transferred through a conductive sensor pattern element 22 to an output coil 16 mounted on protected element 24. Conductive sensor pattern element 22 may be a serpentine conductive wire that traverses a path along the entire area of the door 24. The serpentine path 25 is arranged to maintain a minimal spacing between adjacent portions such that an opening cannot be cut into or through door 24 without breaking the electrical current flowing in path 25. Any break in the path 25, i.e., failure of the return signal, indicates an alarm condition, e.g., an attempted breach of the protected element 24. Signal Tx is generated from a microcontroller.

The wire conductor for conductive sensor pattern element 22 may be insulated where metal door parts may come into contact with conductive sensor pattern element 22 when installed. In alternate embodiment, a non-insulated wire conductor may be used where the conductive wire is embedded in or separated by a nonconductive material. In other embodiments, conductive sensor pattern element 22 may be a fiber optic cable woven over a surface area of the door such that signal transmission will be interrupted in the event of a breach. The monitored element may be formed by embedding conductive sensor pattern element 22, or array in a nonconductive material, such as concrete; interposing the array between laminates sheets of a non-conductive material; overlaying layers of arrays that are insulated so the layered arrays are in direct contact; overlaying layers of uninsulated arrays that have an insulated layer therebetween; and lastly, fastening the array to a nonconductive sheet or material by various methods including but not limited to sewing or mechanical fasteners. For example, the serpentine conductor could be intermittently fastened to a flexible or nonflexible, non-conductive sheet by sewing a fastening loop over the array at one or more, or a plurality of fastening points. The sewing may be, e.g., located at specific fastening points along the array, or a continuous attachment process across the array. The array may be one or more panels interconnected electrically or, in the case of a fiber optic array, optically. In still other exemplary embodiments, conductive sensor pattern element 22 may be a grid formed by overlaying serpentine wire patterns perpendicularly, with proper insulation to prevent short-circuiting the continuity of the signal path. What is sewn into the material is a fiber (organic, metal, etc.) that is used to attach the array to a substrate. The array, substrate and weaving fiber form a composite panel (e.g., wire conductors may be stitched to a polyester fabric substrate, or fiber optic cables stitched to a thin plastic substrate).

The return signal 30 is induced in the output coil 16 and in turn inductively coupled with receive coil 18. Coil 18 is in communication with a receiver Rx processed into a digital signal (A/D). The Tx signal 28 and Rx digital signal 30 patterns are then compared and processed by microcontroller 40. If Tx and Rx match, no alarm is sent. If the Rx digital signal is not detected or if the Tx and Rx digital signal patterns do not match or if the Rx signal strength is not within a pre-calibrated range, an alarm signal 38 is output from microcontroller 40 to a remote alarm panel or other annunciator (not shown) to alert security personal monitoring the protected element or elements 24.

FIG. 2 shows an exemplary embodiment of a door monitoring system 10 using the system described above with respect to FIG. 1. A door frame assembly 31 has a door 32 attached thereto by hinges 34 or similar hardware for swinging the door 32 between an open and closed position. An electrical conductor 36 transmits building power or other electrical signals to first coil 12. A second coil 14 is positioned on door 32 opposite first coil 12, and inductively coupled with first coil 12 for receiving the input power or signal. The output of coil 14 is connected to serpentine conductive path 22 in door 32. In one embodiment, conductive path 22 covers most of the surface area of door 32, comprised of continuous, generally parallel paths 25 weaving back and forth across the surface and spaced a predetermined distance apart, the spacing determined by the minimum size of an opening that would be considered a security breach that would allow an intruder to access the monitored area. In an alternate embodiment, the paths 25 may be arranged in a random pattern with minimum spacing, rather than parallel.

Conductive path 22 conducts signal 28 through door 32 to coil 16. Coil 16 is also positioned on door 32 and connected to the output terminal of conductive path 22. Coil Signal 28 is electromagnetically coupled to coil 18 through coil 16, when coils 16, 18 are positioned adjacently in a closed-door position. Coil 18 is coupled with an alarm circuit via conductor 37 in door frame 31. The air gap separating coils 16 and 18 must be maintained within a certain configurable distance of separation, which distance may be calibrated within a tolerance suitable for the security level and purpose associated with the monitored door. When coil pairs 12, 14 and 16, 18 are separated by a distance greater that the calibrated separation distance, the magnetic coupling is interrupted and the received signal Rx no longer matches the transmitted signal Tx within the configured limits that are acceptable. When the calibrated level of mismatching occurs, an alarm signal is generated.

Conductive path 22 may be arranged on a surface of door 32 or embedded beneath the door surface to conceal and protect the wire path from tampering or weather damage, depending on the application.

Also, the transmitted signal 28 may be modulated in a variety of waveforms for enhanced security. A high frequency pulse pattern may be used to ensure that intruders cannot bypass a DC or continuous AC signal by short circuiting around the induction coils. The modulated signal may also have asymmetric waveforms and intervals to further enhance the level of difficulty for spoofing the signal.

FIG. 3 shows another exemplary embodiment of the inductive circuit sensor system 10, applied to a secure box or vault 50 disposed on a floor surface 52. For purposes of illustration, a six-sided geometry, or cuboid shape, is used. One or more surfaces 54 on box 50 may be wrapped with serpentine conductive path or wire 22. At each terminus of conductive path 22 is an inductive coil, including input coil 14 and output coil 16. Coils 14 and 16 are positioned on a bottom surface 54 to align with coils 12 and 18, respectively. Coils 12 and 18 are permanently mounted in the facility in the floor 52 or similar stationary surface supporting the box 50. As described in greater detail above with respect to FIGS. 1 and 2, coils 12, 14 inductively couple the input signal Tx with conductive path 22, and coils 16, 18 inductively couple the conductive path carrying signal Tx with receiver Rx in communication with an A/D converter 42. A/D converter conditions the received signal and inputs it to microcontroller 40. Microcontroller 40 then applies programmed logic to determine if alarm thresholds are exceeded, or if the system is out of calibrated tolerances. If the monitored box is lifted or moved, coil pairs 12, 14 and 16, 18 become separated, thus interrupting the signal 30.

In another exemplary embodiment, the inductive circuit sensor 10 may be implemented using a single coil pair, e.g., 12, 14, and substituting a pair of electrical contacts (not shown) for the second coil pair, e.g., 16, 18. The contact pair makes, or closes, when the monitored element is in a fixed, or closed, position, so that the signal coupled between coils 12, 14 is transmitted to microcontroller as described with respect to FIG. 1 above. The contacts may include multiple contact pairs to provide power and communication circuits, e.g., an energy source in the door (capacitor, battery, or supercapacitor) and power to door electronics for communicating with the door frame microcontroller via inductive signals and supplemental contact pair.

Referring next to FIG. 4, an exemplary flow diagram 100 of the inductive current sensing method is shown. At step 102, the system is powered and initialized. Next the method proceeds to step 104 to determine whether the system is in calibration mode. If yes, the system proceeds to step 106, and thresholds are calibrated. Otherwise, at step 106, calibration is bypassed and advances to step 108, calibration is confirmed as completed. After step 108, method 100 proceeds to step 110 and a digital pattern Tx is generated by the microcontroller and transmitted to the inductive sensing circuit. Next, at step 112, the method queries whether the digital pattern has been received at Rx. If the digital pattern has not been received at Rx, a first alarm is generated at step 114. If the digital pattern was received at Rx, then the method proceeds to step 116 and queries whether the received signal Rx is less than a predetermined upper limit as set in the microcontroller. If signal Rx level is not less than the upper limit, a second alarm is generated at step 118. If signal Rx level is less than the upper limit, then the method proceeds to step 120 and determines whether signal Rx is greater than a predetermined lower limit as set in the microcontroller. If signal Rx level is not greater than the upper limit, a third alarm is generated at step 122. If signal Rx level is greater than the lower limit, then the method returns to step 110 and recursively repeats the steps beginning with step 110.

While the exemplary embodiments illustrated in the figures and described herein are presently preferred, it should be understood that these embodiments are offered by way of example only. Accordingly, the present application is not limited to a particular embodiment but extends to various modifications that nevertheless fall within the scope of the appended claims. The order or sequence of any processes or method steps may be varied or re-sequenced according to alternative embodiments.

The present application contemplates methods, systems and program products on any machine-readable media for accomplishing its operations. The embodiments of the present application may be implemented using existing computer processors, or by a special purpose computer processor for an appropriate system, incorporated for this or another purpose or by a hardwired system.

It is important to note that the construction and arrangement of the inductive circuit sensor systems and methods shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

As noted above, embodiments within the scope of the present application include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It may also be noted that although the figures herein may show a specific order of method steps, it is understood that the order of these steps may differ from what is depicted. Also, two or more steps may be performed concurrently or with partial concurrence. Such variation will depend on the software and hardware systems chosen and on designer choice. It is understood that all such variations are within the scope of the application. Likewise, software implementations could be accomplished with standard programming techniques with rule based logic and other logic to accomplish the various connection steps, processing steps, comparison steps and decision steps.

The invention claimed is:

1. An inductive circuit sensor system for monitoring an electromagnetic signal path through a circuit, the system comprising:
    a protected element and a stationary frame element; wherein the protected element is movably positionable adjacent to the stationary element when the protected element is in a monitored position;
    the protected element comprising:
    a conductive sensor pattern element; the conductive sensor pattern element comprising a first end connected to a first inductive coil and a second end connected to a second inductive coil; the conductive sensor pattern element comprising a conductive wire arranged in a path traversing a predetermined cross-section of the protected element; and
    the stationary frame element comprising:
        a transmitting coil in electromagnetic communication with a microcontroller, the transmitting coil electromagnetically coupled with the first inductive coil; and a receiving coil electromagnetically coupled with the second inductive coil;
        the transmitting coil arranged to receive a signal from a transmit port on the microcontroller and couple the signal to the conductive sensor pattern element via the first inductive coil; the signal coupled through second inductive coil to the receiving coil;
        the receiving coil in communication with a receiving port on the microcontroller;
        wherein the microcontroller is configured to compare the signal from the transmit port transmitted to the transmit coil with the signal at the receiving port from the receiving coil.

2. The inductive circuit sensor system of claim 1, wherein the protected element is a door.

3. The inductive circuit sensor system of claim 2, wherein the conductive sensor pattern element substantially traverses an entire area of the door.

4. The inductive circuit sensor system of claim 1, wherein the conductive sensor pattern element comprises a serpentine path.

5. The inductive circuit sensor system of claim 4, wherein the serpentine path comprises a plurality of parallel paths, the serpentine path being arranged with a predetermined spacing between the respective parallel paths; wherein an opening in the protected element breaks the conductive circuit pattern element and interrupts the signal passing therethrough.

6. The inductive circuit sensor system of claim 5, wherein an interruption of the signal through the conductive circuit pattern element is detected by the microcontroller to indicate an alarm condition.

7. The inductive circuit sensor system of claim 1, wherein the microcontroller is configured to generate an alarm condition in response to determining that a received signal from the receiving coil varies from a transmitted signal to the transmitting coil; the receiving coil in communication with a receiver processed into a digital signal;
    the microcontroller configured to compare the transmitted signal Tx and the received signal Rx, wherein if Tx and Rx match, no alarm is sent; and
    if the Rx digital signal is not detected or if the Tx and Rx digital signal patterns do not match or if the Rx signal strength is not within a pre-calibrated range, an alarm signal is output to a remote alarm panel.

8. The inductive circuit sensor system of claim 1, wherein the signal is a modulated digital signal; the modulated digital signal having a waveform selected from one of a high frequency pulse pattern, an asymmetric waveform and interval waveform.

9. The inductive circuit sensor system of claim 1, wherein the first inductive coil and the second inductive coil are embedded within or mounted on a surface of the protected element.

10. A method for detecting a security breach of a protected element, comprising:
    generating a signal by the microcontroller;
    transmitting the signal to an inductive sensing circuit;
    querying whether the digital pattern is received and:
    in response to the signal not being received, generating a first alarm condition; and
    in response to the signal being received:
    querying whether the received signal is less than a predetermined upper limit and:

in response to the received signal exceeding the upper limit, generating a second alarm condition;

in response to the received signal being less than the upper limit, querying whether the signal exceeds a predetermined lower limit; and in response to determining the received signal to be less that the lower limit, generating a third alarm condition.

11. The method of claim 10, further comprising:
in response to determining that the signal is equal to or greater than the lower limit, then recursively repeating the method.

12. The method of claim 10, further comprising:
powering and initializing a microcontroller;
determining whether the system is in a calibration mode;
in response to determining calibration mode, calibrating a plurality of threshold parameters; and
in response to determining that the system was previously calibrated, confirming that calibration is complete.

13. The method of claim 10, further comprising, further comprises comparing a received signal with the transmitted signal; and in response to detecting a mismatch between the received signal and the transmitted signal, generating a fourth alarm condition.

14. The method of claim 10, wherein the step of generating a signal comprises generating a digital pattern Tx.

15. The method of claim 14, wherein the digital pattern is defined in the microcontroller.

16. A door frame assembly comprising:
a door, the door being attached to the door frame assembly to move the door between an open and closed position;
an electrical conductor to transmit power to a first coil; and
a monitoring circuit comprising:
a second coil being disposed on door opposite the first coil, and inductively coupled with the first coil for receiving the input power;
an output of the second coil in communication with a serpentine conductive path disposed in the door, the serpentine conductive path arranged to cover a predetermined surface area of the door, the serpentine conductive path conducts the signal through the door to a third coil, the third coil positioned on the door, the third coil further connected to an output terminal of the serpentine conductive path;
a coil signal being electromagnetically coupled by the third coil to a fourth coil;
the fourth coil being in communication with an alarm circuit via a return conductor in door frame;
wherein an air gap separating the first coil and the second coil being maintained at less than or equal to a predetermined distance of separation such that when the first coil and the second coil are separated by a distance greater than the predetermined distance of separation, the magnetic coupling is interrupted and the received signal Rx does not equal the transmitted signal Tx when sensed by a microcontroller in communication with the serpentine conductive path.

17. The door frame assembly of claim 16, wherein the serpentine conductive path comprises a plurality of parallel paths in electrical communication, the serpentine conductive path being arranged with a predetermined spacing between the respective parallel paths; wherein an opening in the protected element breaks the conductive circuit pattern element and interrupts the signal.

18. The door frame assembly of claim 16, further comprising a microcontroller in electromagnetic communication with the monitoring circuit for generating the signal Tx and receiving the signal Rx.

19. The door frame assembly of claim 18, wherein the microcontroller is configured to:
generate a signal by the microcontroller;
transmit the signal to the monitoring circuit;
query whether the digital pattern is received:
in response to the signal not being received, generating a first alarm condition; and
in response to the signal being received:
query whether the received signal is less than a predetermined upper limit; and
in response to the received signal exceeding the upper limit, generate a second alarm condition;
in response to the received signal being less than the upper limit, query whether the signal exceeds a predetermined lower limit; and
in response to the received signal being less that the lower limit, generate a third alarm condition.

20. The door frame assembly of claim 19, wherein the signal is a modulated digital signal, the modulated digital signal having a waveform selected from one of a high frequency pulse pattern, an asymmetric waveform and interval waveform.

* * * * *